United States Patent [19]
Wood

[11] Patent Number: 5,611,397
[45] Date of Patent: *Mar. 18, 1997

[54] REVERSE MOINEAU MOTOR AND CENTRIFUGAL PUMP ASSEMBLY FOR PRODUCING FLUIDS FROM A WELL

[76] Inventor: Steven M. Wood, 4904 E. 113th, Tulsa, Okla. 74137

[*] Notice: The term of this patent shall not extend beyond the expiration date of Pat. No. 5,417,281.

[21] Appl. No.: 447,122

[22] Filed: May 22, 1995

Related U.S. Application Data

[63] Continuation-in-part of Ser. No. 194,835, Feb. 14, 1994, Pat. No. 5,417,281.

[51] Int. Cl.$^6$ .................................................. E21B 43/00
[52] U.S. Cl. ........................... 166/68; 166/105; 417/406; 418/48
[58] Field of Search ................ 166/105, 68, 68.5, 166/369; 418/48; 417/405, 406

[56] References Cited

U.S. PATENT DOCUMENTS

| | | | |
|---|---|---|---|
| 2,085,115 | 6/1937 | Moineau | 77/466 |
| 2,100,560 | 11/1937 | Kennedy | 417/406 X |
| 2,483,370 | 9/1949 | Moineau | |
| 2,739,650 | 3/1956 | Hill | 166/106 |
| 3,203,350 | 8/1965 | Chang | |
| 3,753,628 | 8/1973 | Becker | 166/68 |
| 3,840,080 | 10/1974 | Berryman | 175/107 |
| 3,912,426 | 10/1975 | Tschirky | 418/48 |
| 3,932,072 | 1/1976 | Clark | 418/48 |
| 4,003,678 | 1/1977 | David | 417/405 X |
| 4,372,379 | 2/1983 | Kulhanek et al. | 166/68.5 |
| 4,386,654 | 6/1983 | Becker | 166/105.5 |
| 4,415,316 | 11/1983 | Jurgens | 418/48 |
| 4,580,955 | 4/1986 | Karge | 418/5 |
| 4,614,232 | 9/1986 | Jurgens et al. | 166/105.5 |
| 4,636,151 | 1/1987 | Eppink | 418/48 |
| 4,718,824 | 1/1988 | Cholet et al. | 417/14 |
| 4,721,436 | 1/1988 | Lepert | 417/406 X |
| 4,797,075 | 1/1989 | Edwards et al. | 418/48 |
| 4,828,036 | 5/1989 | Simmons | 166/369 |
| 4,923,376 | 5/1990 | Wright | 418/48 |
| 5,015,162 | 5/1991 | Heppner | 418/48 |
| 5,320,500 | 6/1994 | Cholet | 417/405 X |

FOREIGN PATENT DOCUMENTS

| | | | |
|---|---|---|---|
| 279042 | 5/1990 | Germany | 418/48 |
| 322525 | 2/1972 | U.S.S.R. | 417/405 |

*Primary Examiner*—Hoang C. Dang
*Attorney, Agent, or Firm*—Head, Johnson & Kachigian

[57] ABSTRACT

A downhole submersible fluid pump having a progressive cavity motor section driving a rotary pump such as a centrifugal or axial pump. In the motor section the rotor is fixed and by forcing power fluid into the motor chamber around the rotor causes the normally fixed stator to rotate relative to the fixed rotor. This rotary motion is transmitted via the housing to the rotary member of a centrifugal pump drawing fluids from the subterranean formation upwardly as produced fluids.

9 Claims, 11 Drawing Sheets

REVERSE MOINEAU MOTOR AND CENTRIFUGAL PUMP ASSEMBLY FOR PRODUCING FLUIDS FROM A WELL

RELATED PATENTS

This is a continuation-in-part of copending application Ser. No. 08/194,835, filed Feb. 14, 1994, for A REVERSE MOINEAU MOTOR AND PUMP ASSEMBLY FOR PRODUCING FLUIDS FROM A WELL, now U.S. Pat. No. 5,417,281, which is incorporated herein by reference.

FIELD OF THE INVENTION

This invention relates to a well pump system for pumping fluids, particularly hydrocarbon bearing materials, from a producing formation to the ground surface.

BACKGROUND OF THE INVENTION

Various and sundry forms of pumps have been taught for producing fluids, in particular oil bearing materials, from well formations. Such pumps as rotary or screw pumps of the type which include a stator affixed to an outer tubing together with a rotor which is driven by a shaft leading from suitable drive mechanism at the surface. The rotor and stator are cooperatively shaped to provide a sufficient pumping pressure to transmit the fluids from the pump through the tubing to the surface where they are further processed.

Examples of pumps of this type are commonly known as Moineau pumps or progressive cavity pumps and will be found in patents such as U.S. Pat. Nos. 2,085,115; 4,797,075; 4,718,824; and 3,753,628 and many more.

Pumps of this type have been particularly developed for pumping fluids containing particles, i.e. crude oil ladened with sand, which would otherwise easily damage more common type of reciprocating oil well pumping systems. In all instances of the aforesaid pumps of the type described above, these include a rotating drive string (such as a rod string or a tubular string) which is suspended within a stationary tubular production string and rotated such as shown in U.S. Pat. No. 4,372,379.

A Moineau pump with a rotating outer member is found in U.S. Pat. No. 3,932,072 of Clark which teaches the concept of a Moineau pump, not for oil well pumping purposes, in which the outer tubing and normally stator portion of the pump is rotated relative to a fixed rotor. Such a pump system, however, teaches a mechanical means for rotating the normally stator portion.

U.S. Pat. No. 4,614,232 of Jürgens et al. teaches a downhole pump means in which power fluid is used to rotate a rotor within a stator as a part of the drive means which rotor includes a second portion rotor and stator of a pump means wherein the rotor is rigidly a one piece connection.

SUMMARY OF THE INVENTION

It is an object of the prior copending application, invention and patent to provide a downhole pump for producing fluids from formations within a well bore to the surface utilizing pressurized power fluid which is directed to a first Moineau-like power-pump chamber which, in this instance, acts to cause the rotation of an outer normally stator housing containing internal Moineau helical threads relative to a fixed rotor. The rotatable outer housing also encompasses a second pump chamber section where the rotation of stator, again with internal Moineau helical threads relative to a fixed rotor, will pump well fluids into a separate production tubing to the surface.

Specifically, the prior invention related to a downhole pump for producing fluids from well formations which includes a first production tubing that is affixed within the well bore having means at its lower end thereof adjacent to formation to receive and produce fluids from the well formation. Concentrically positioned within the production tubing is a fixed inlet power fluid tubing. A fixed outlet power fluid tubing is concentrically positioned between the production tubing and the inlet power fluid tubing which carries the outlet power fluid tubing to the surface for repumping back into the inlet. A motor-pump housing is rotatably connected to the inlet and outlet power fluid tubing sections at the bottom of the well adjacent the producing formation. This housing is divided into a upper progressive cavity motor section and a lower progressive cavity pump section. The motor section is comprised of a chamber formed by an internal helical threaded Moineau stator and an internal helical cooperative rotor which is affixed to the inlet power fluid tubing. The rotor is attached to the tubing by a hollow flexible shaft wherein power fluid enters the shaft and exits into the chamber and thereby effects rotation of the motor pump housing. The rotating helical stator portion includes a helical chamber therein for the return power fluid to outlet power fluid tubing. The pump section includes a pump chamber situated below the motor section and, similar to the motor section, is formed by an internal helical threaded stator in the housing and an internal helical rotor that is affixed by way of a flexible shaft to the production tubing. The flexible shaft will permit "wobble" of the first rotor. The pump section is in communication with and adopted to receive the formation fluids which are caused to pass through the pump chamber, crossover back into the production tubing and thence to the surface for processing.

It is an object of this invention to utilize the concepts of the prior invention by utilizing a progressive cavity motor section, as driven and defined in the prior application, to drive a rotating element of a rotary pump, including the rotor of a progressive cavity pump or the impeller of a centrifugal and axial pumps.

A further object of the invention is to provide a progressive cavity pump wherein the rotor is fixed and the stator housing is caused to rotate by a separate hydraulic power fluid. The rotary motion of the housing is connected to the normally rotating element of a rotary pump or to the impeller of a centrifugal or axial pump to pump fluids from an underground formation to the surface.

Another object of the invention is to provide a hydraulically powered pump system wherein the power fluids remain "clean" and separate from the produced fluids using composites to form continuous axial flow conduits for the input and output of the power fluids and the output for the produced fluids. Using composites permits: (1) use in deviated, crooked or horizontal wells; (2) adaptability to perform in-place downhole formation treatments; and (3) installation in remote or environmentally sensitive areas due to the light weight, flexibility and continuous nature of the composite tubing system.

While the invention has been described with a certain degree of particularity, it is manifest that many changes may be made in the details of construction and the arrangement of components without departing from the spirit and scope of this disclosure. It is understood that the invention is not limited to the embodiment set forth herein for purposes of exemplification, but is to be limited only by the scope of the

3 attached claim or claims, including the full range of equivalency to which each element thereof is entitled.

DETAILED DESCRIPTION OF THE PREFERRED EMBODIMENT

Figure 1A:
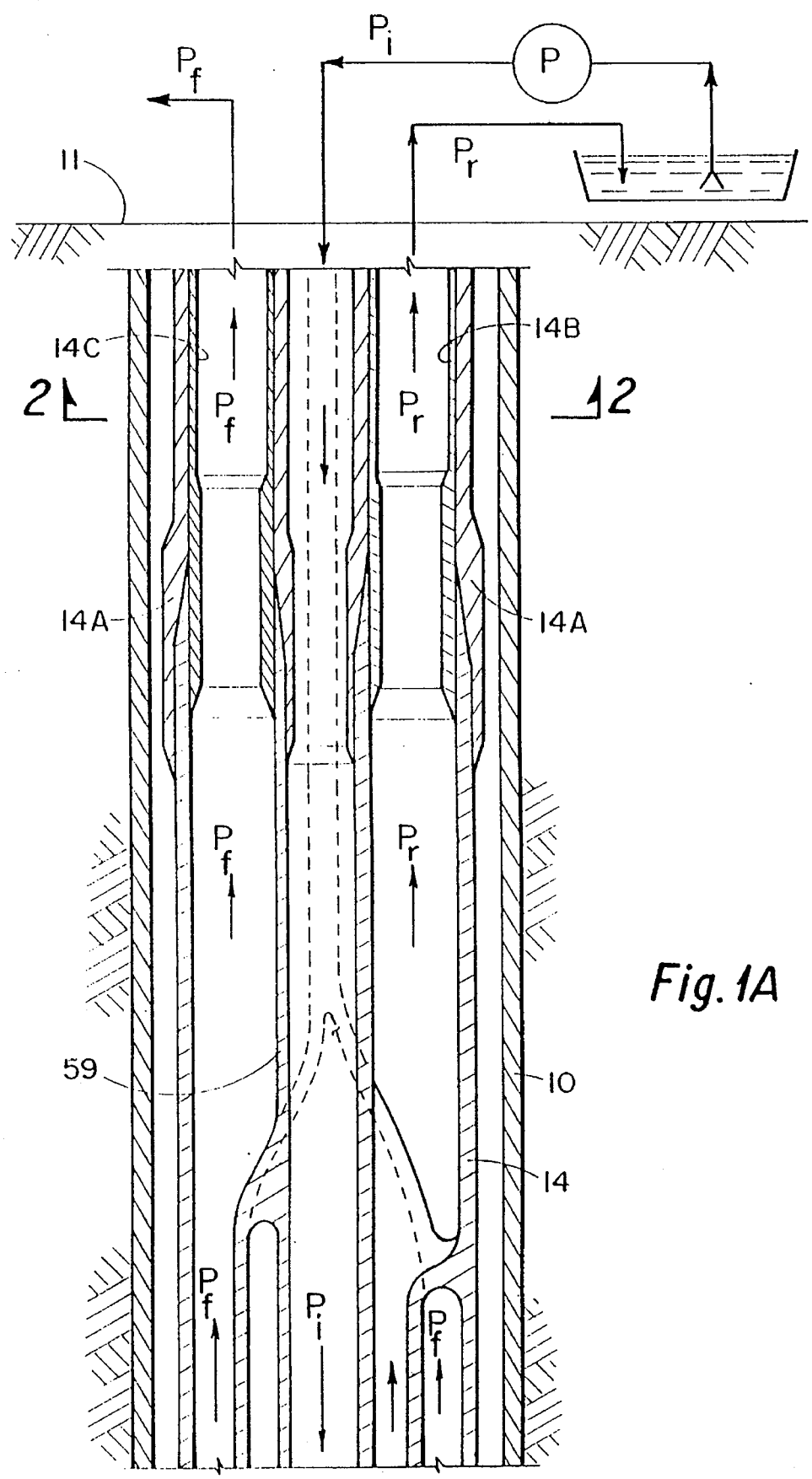
FIGS. 1A, 1B, 1C, 1D and 1E are continuation drawings of the motor pump system of the invention as described in U.S. Pat. No. 5,417,281.
Figure 1B:
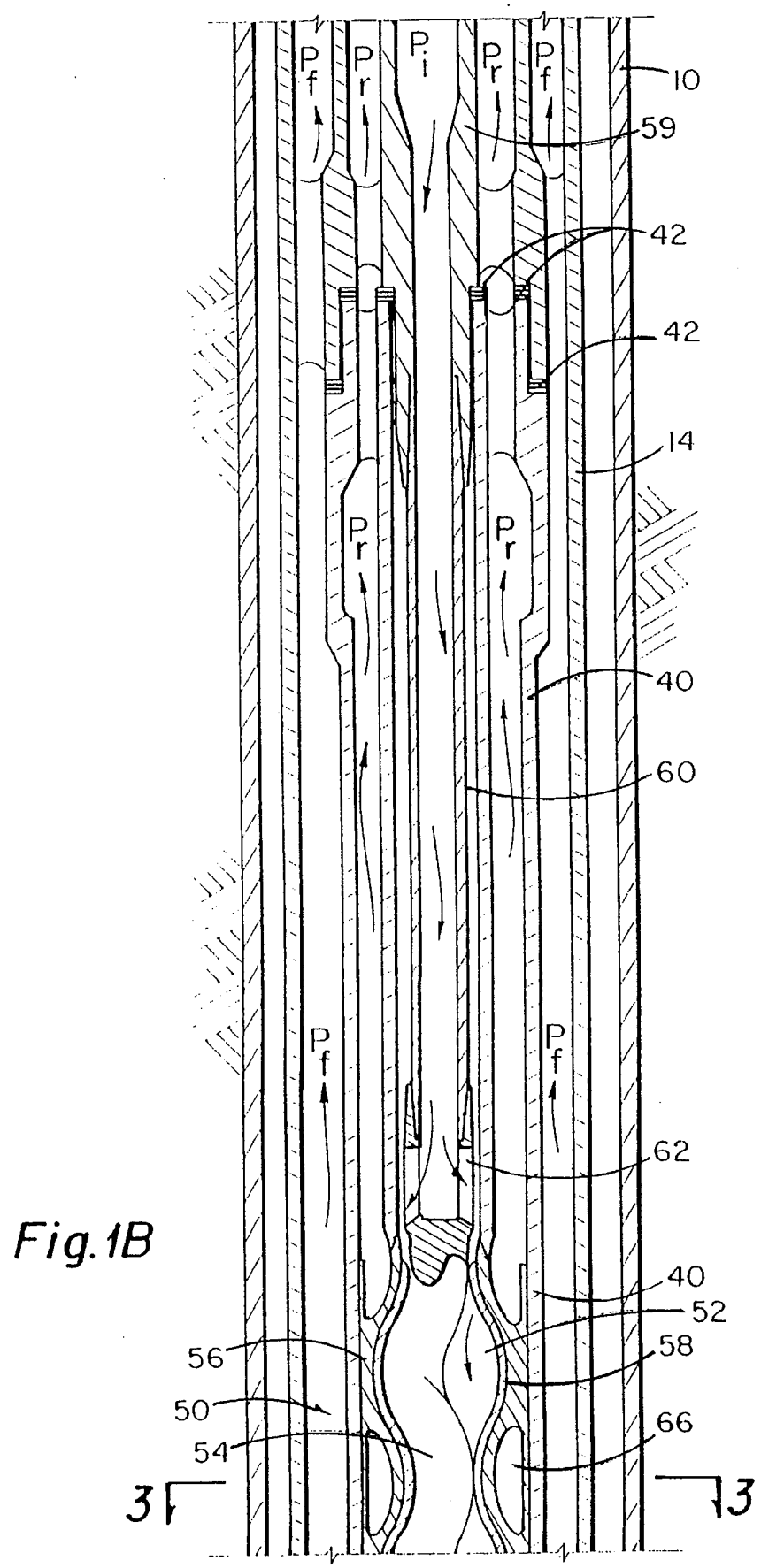
Figure 1C:
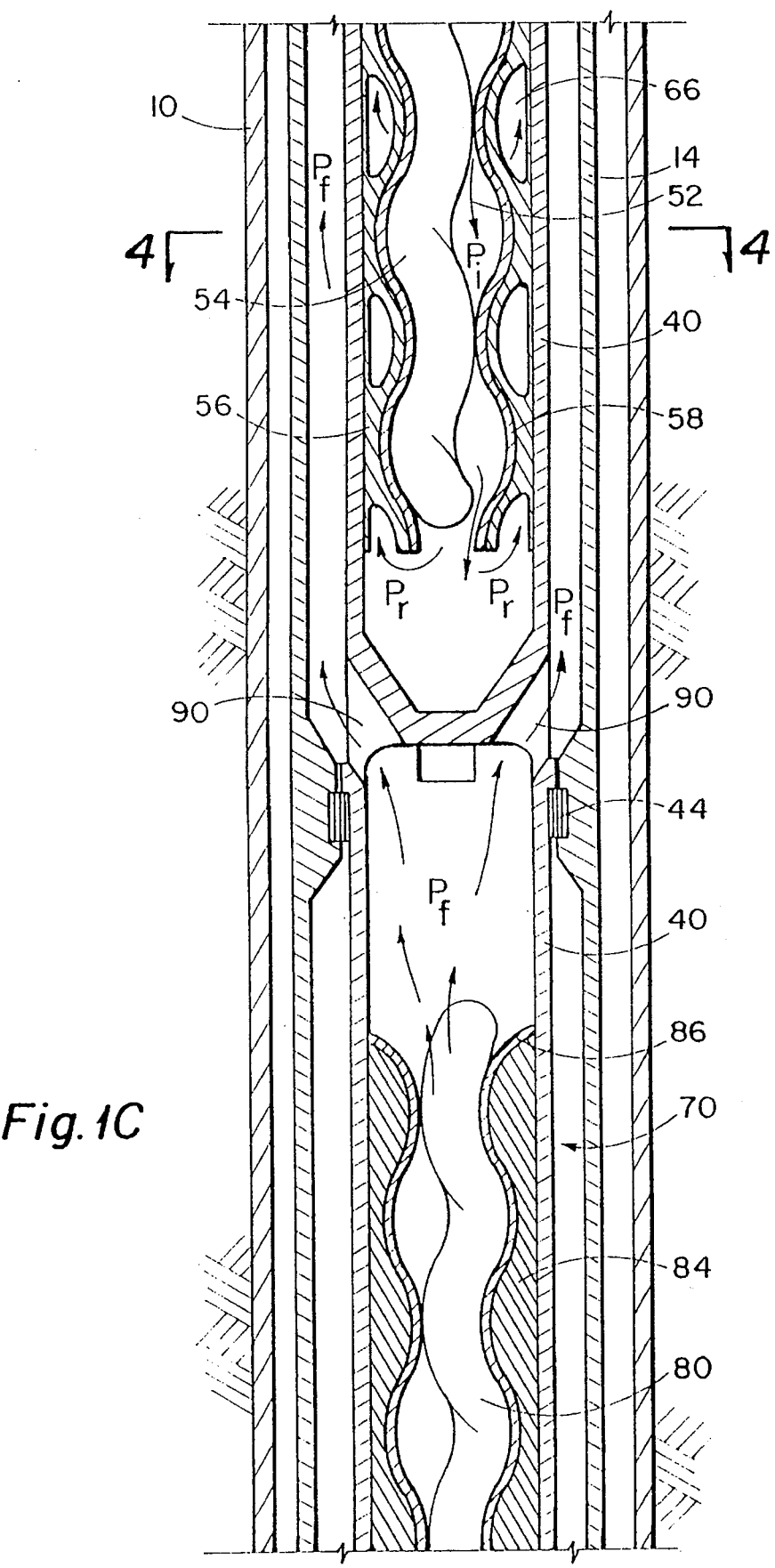
Figure 1D:
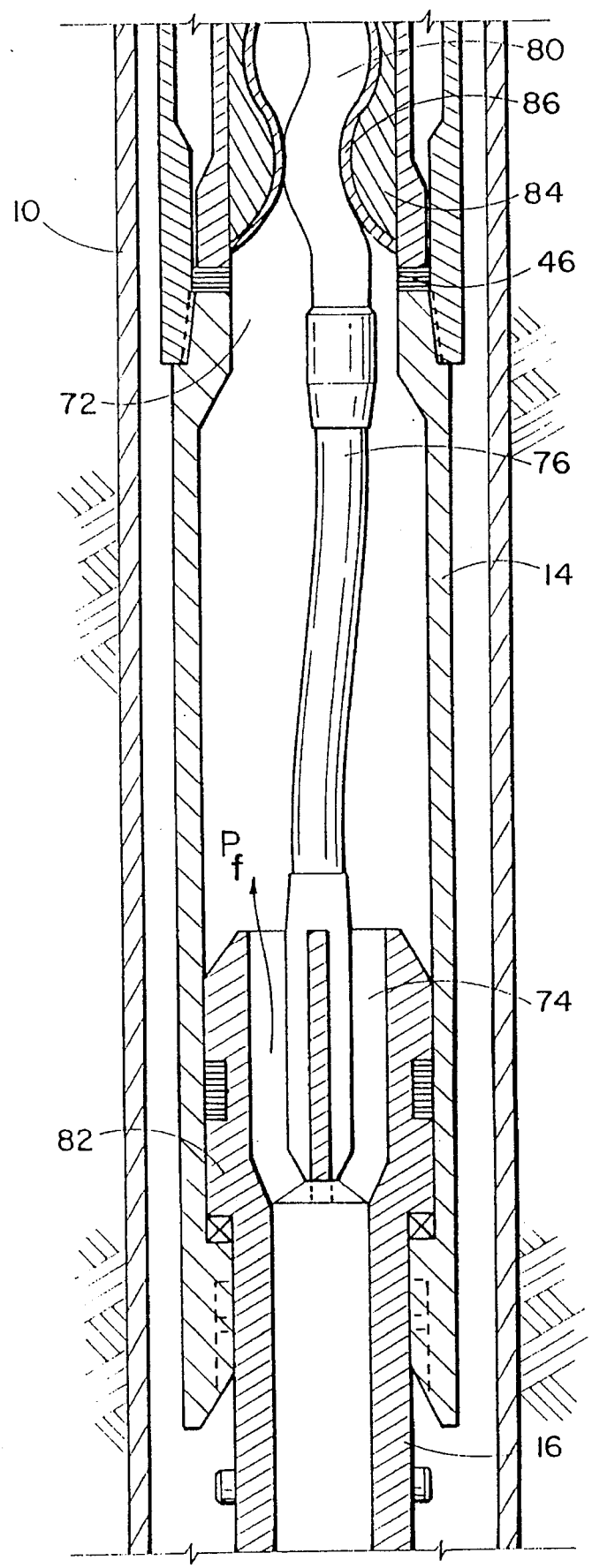
Figure 1E:
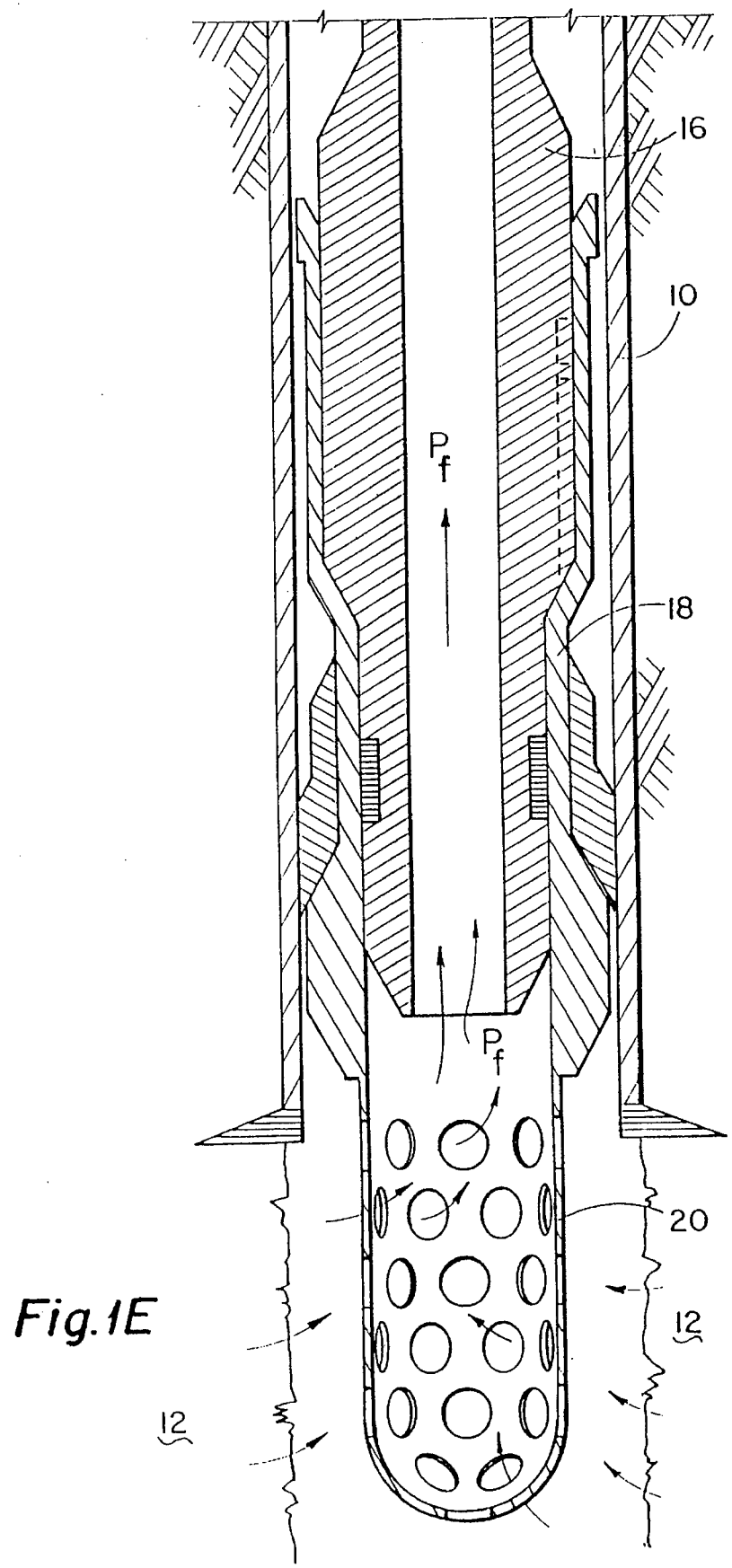

Referring now to FIGS. 1A, 1B, 1C, 1D and 1E herein, the motor pump of this and the prior invention includes a casing 10 which is positioned within a bored well and which may extend from the surface 11 (FIG. 1A) to a subterranean formation 12 (FIG. 1E). Production tubing 14 and 14A likewise extends from the ground surface to the formation.

As shown in FIG. 1D, the production tubing 14 terminates within a seating nipple 16 at the lower end thereof which is seated within a mandrel 18, it having a screen 20 at the bottom thereof in communication with the well fluids from the formation 12.

Figure 2:
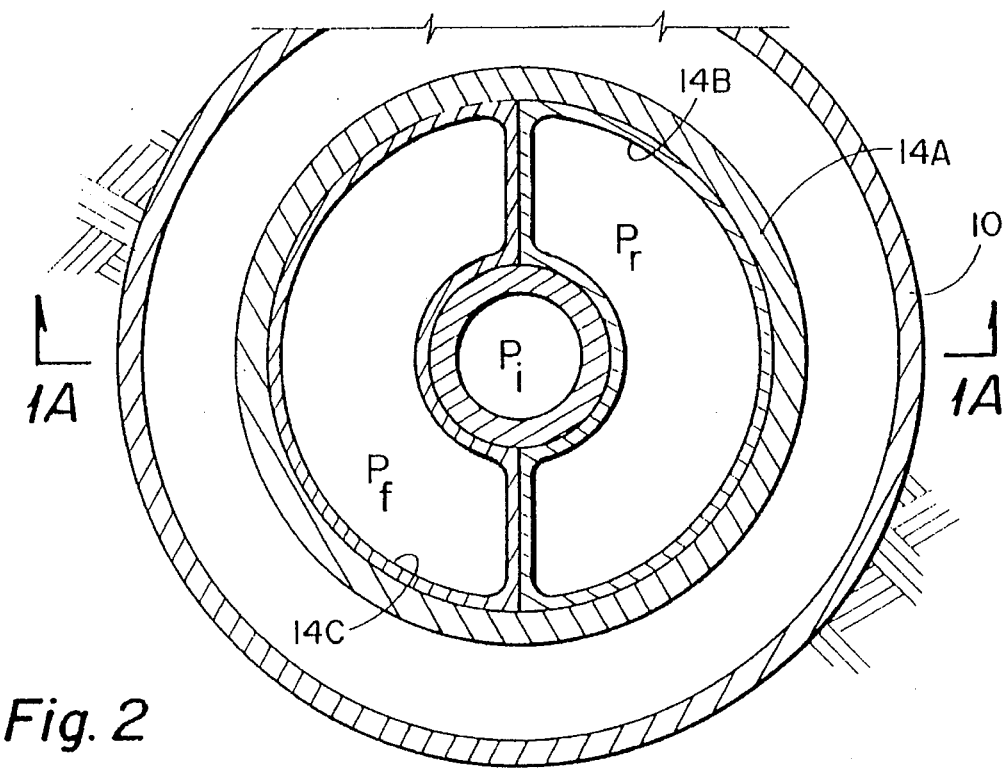
FIG. 2 is a sectional view taken along the line 2—2 of FIG. 1A.
Figure 3:
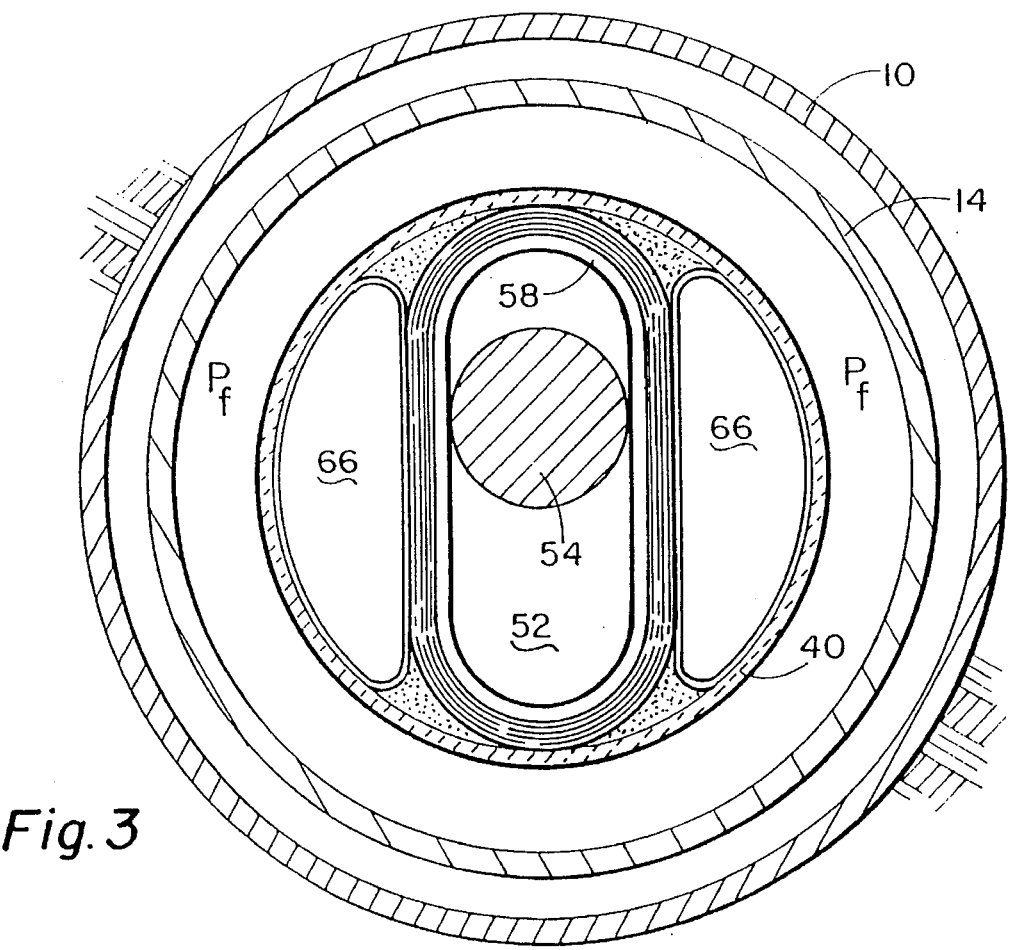
FIGS. 3 and 4 are sectional views through the motor pump section taken along the lines 3—3 and 4—4 respectively.
Figure 4:
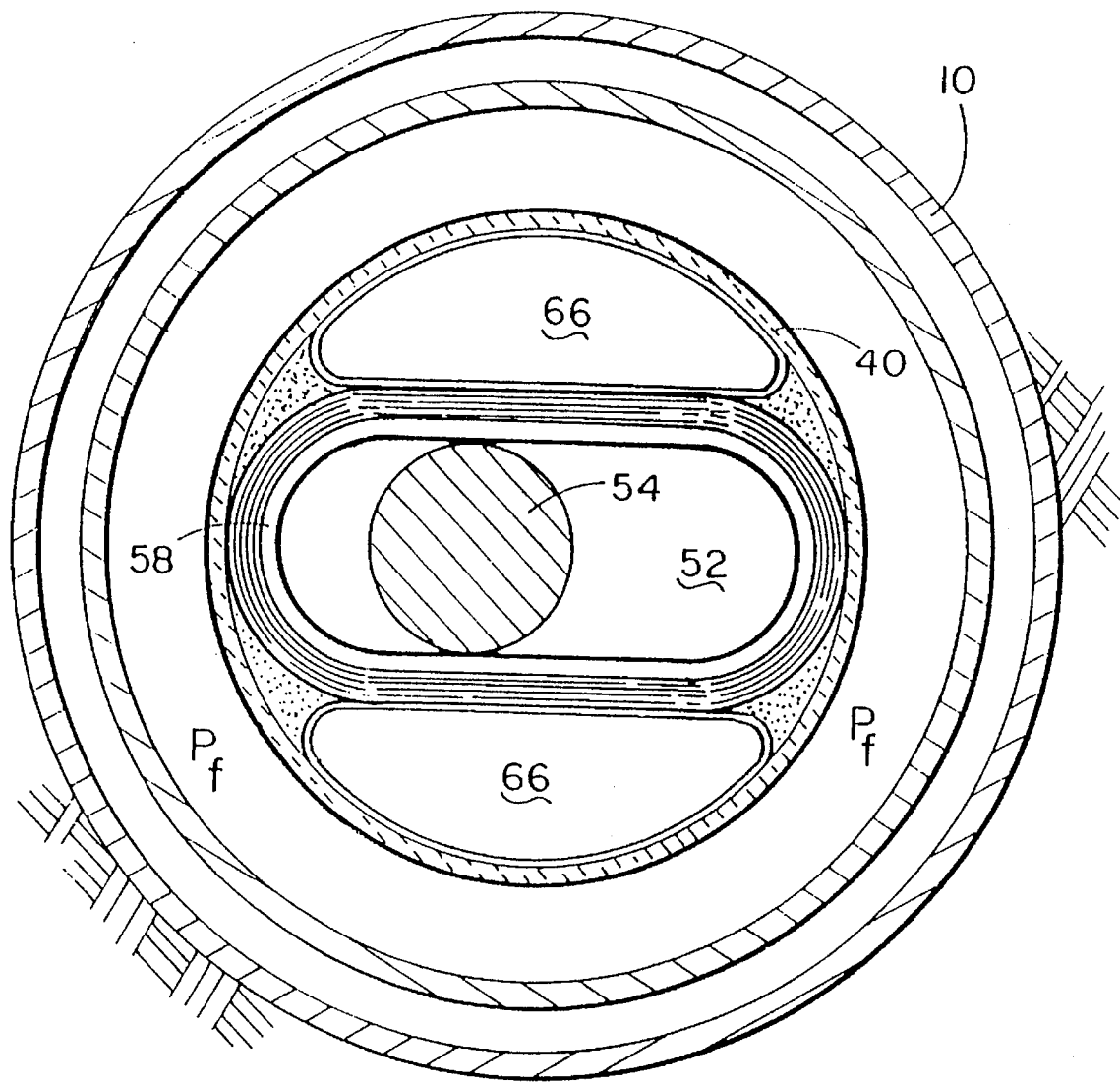
Figure 5:
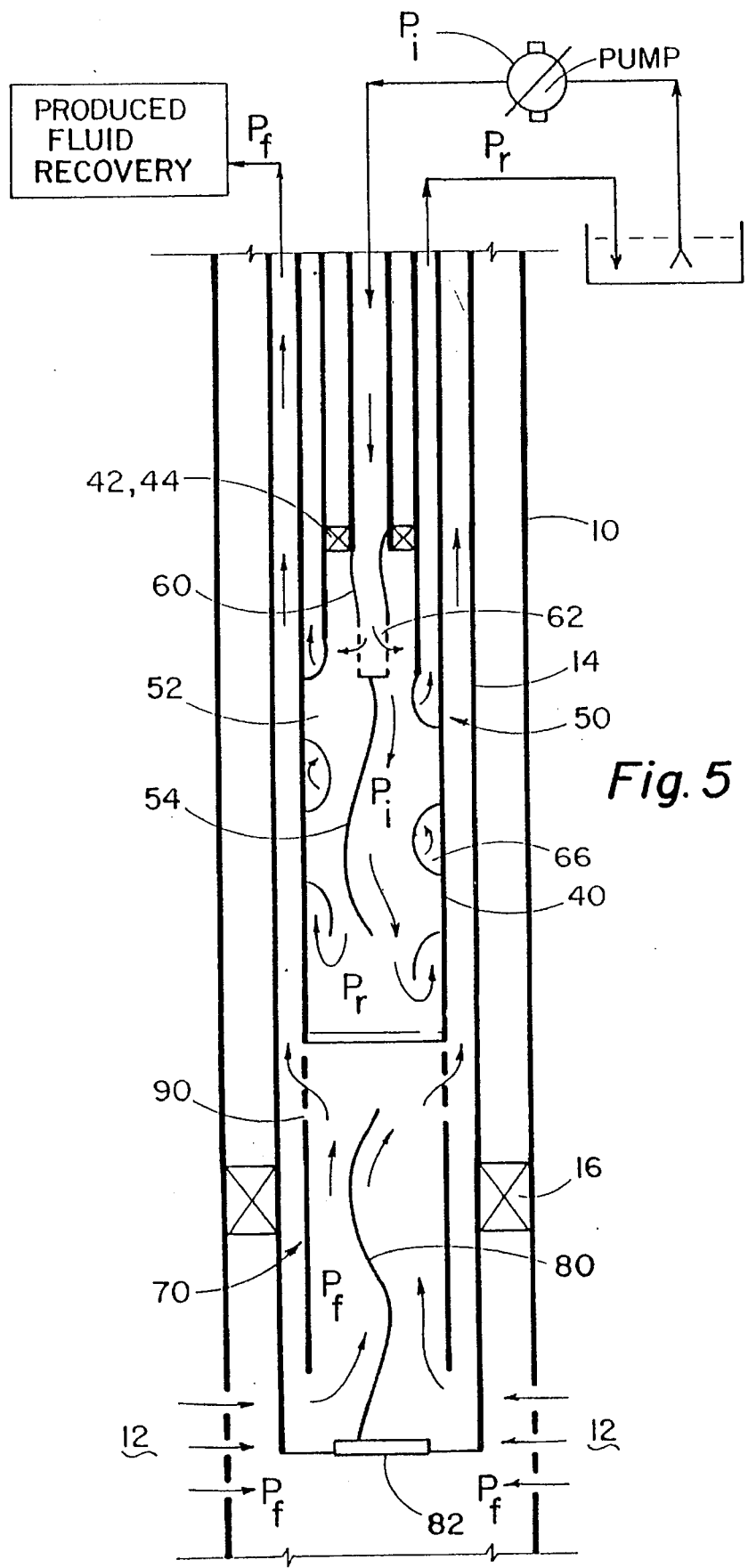
FIG. 5 is a schematic representation of the motor pump system of the invention as described in U.S. Pat. No. 5,417,281.

As shown in FIG. 1A, one embodiment of the invention encompasses the use of metal tubing 14 joined with composite tubing 14A and separate liners 14B and 14C (see FIG. 2). Such composite materials include carbon fiber, ceramic fiber, glass fiber, natural fiber, metallic fiber, resin impregnated fibrous reinforcement fabrics, tapes and so on, and synthetic fibers used for reinforcing in thermoplastic molding compounds. In this particular instance, a continuous wound fibrous reinforcement which has been internally segmented into a tubular form with multiple compartments will satisfy the needs of this invention. The construction of the tubing can occur by being formed on a mandrel in a manner well known to those skilled in the art.

The motor pump housing 40 extends vertically downward within the production tubing 14 and is rotatably supported relative to the tubing 14 by suitable bearings and seals 42 (FIG. 1B), 44 (FIG. 1C) and 46 (FIG. 1D) at the lower end thereof. As shown in FIGS. 1B and 1C, the motor-pump housing 40 is comprised of the motor section generally designated by the numeral 50 and the pump section generally designated by the numeral 70.

The motor section 50 internally includes a progressive cavity type motor forming a chamber 52 within which rotor 54 is fixably positioned relative to a helical stator threads 56 which is lined by elastomeric or composite material 58. The rotor is rigidly connected to the power fluid inlet tubing 59 by a hollow flexible shaft 60 wherein power fluid ($P_i$) from the surface enters and passes outwardly through openings 62 within the flexible shaft into the chamber 52, the action of which causes the rotation of the motor pump housing 40.

4

The power return fluid designated $P_r$ in the drawings is returned from the bottom of the motor housing into the helical return fluid passageways 66 formed as a part of the rotating stator 56.

The pump section 70, in the embodiment of the prior patent is located below the motor section 50, includes a chamber 72 which is in communication with the well fluids being produced from formation 12 via strainer 20 and designated as $P_f$ herein. The production fluid passes through the mandrel 16 and through bypass passages 74 formed within the fixed rotor sleeve for passage upwardly through the progressive cavity pump into the production tubing 14 where it rises to the surface for further processing.

Figure 6:
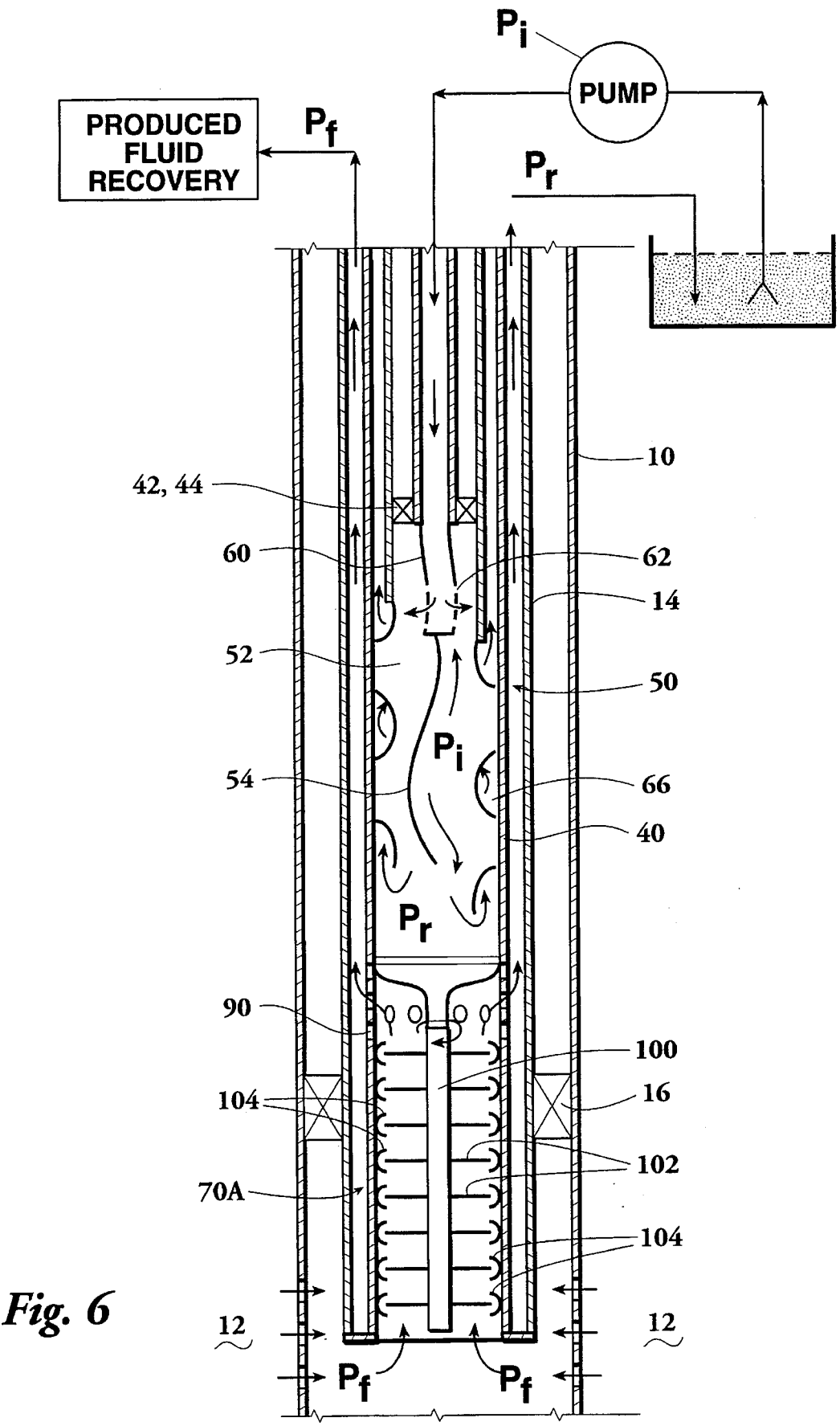
FIG. 6 is a schematic representation of the motor pump system of this invention.
Figure 7:
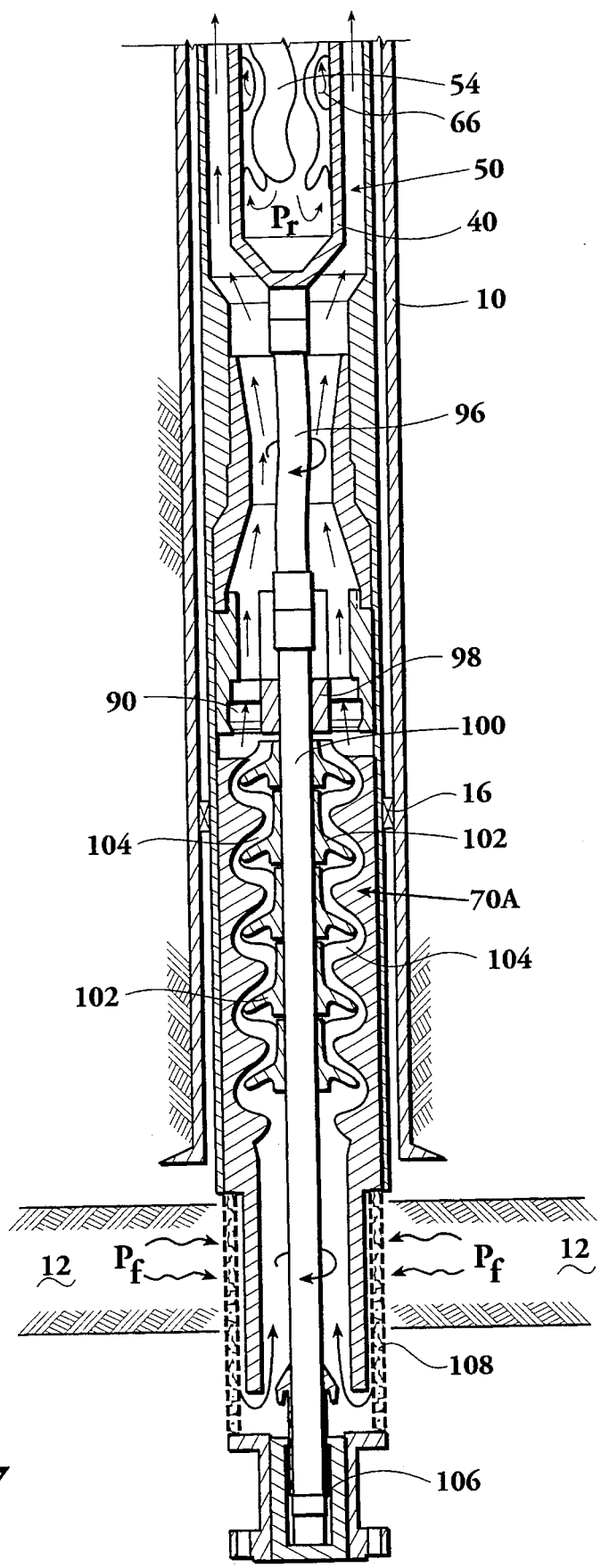
FIG. 7 is a sectional view of a progressive cavity motor/centrifugal pump assembly according to this invention.

In this embodiment, the pump section 70A is comprised of a rotatable shaft 100 connected to the rotatable motor housing 40. The shaft drives impellers 102 relative to volutes or diffuser vanes 104 surrounding the impellers as is well known in the art. This is shown schematically in FIG. 6 and specifically in FIG. 7. The rotary housing 40 of the motor section 50 connects via shaft 96 and appropriate axial and thrust bearing 98 to rotor shaft 100 to which are connected impellers 102. Other appropriate bearings 106 are provided to support the shaft 100. Produced fluids $P_f$ from the formation 12 enter the pump area via screen to the pump impellers. The produced fluids $P_f$ are then caused to traverse upwardly through bypass or cross-over openings 90 formed at the top of the pump section and below the motor housing section.

As shown in the sectional view of FIG. 2, the various conduits can be divided or segmented as shown to receive the fluids $P_i$, $P_r$, and $P_f$. However, other forms of concentric conduit forms are inclusive in this invention.

Figure 8:
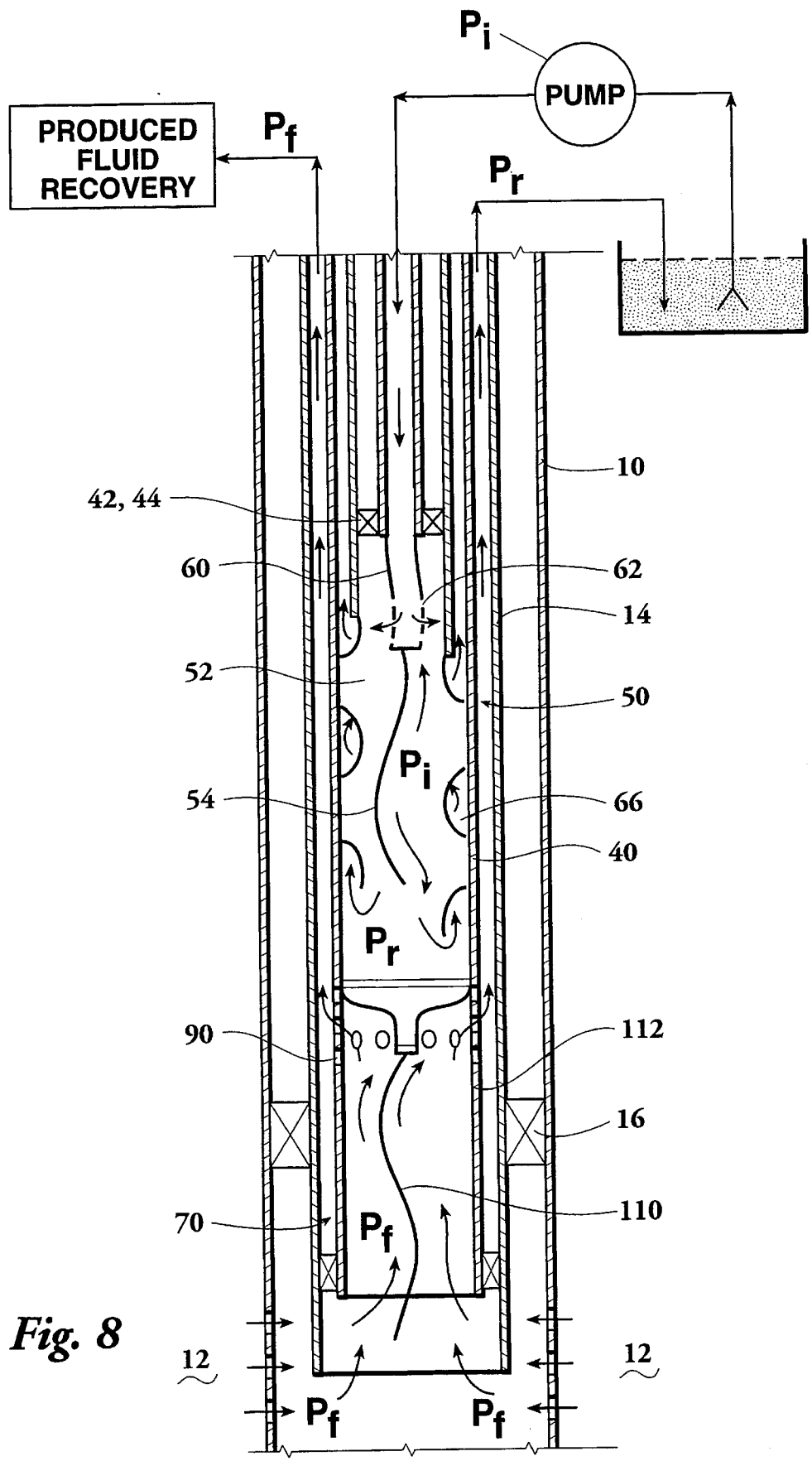
FIG. 8 is a schematic representation of another form of motor pump system of this invention.

FIG. 8 depicts another embodiment wherein the motor pump housing 40 drives the internal rotor 110 relative a fixed helical stator 112 of a progressive cavity pump.

What is claimed:

1. A downhole pump apparatus for producing fluids from a formation within a well bore to the surface, said apparatus comprising:

progressive cavity motor means having a fixed rotor relative to a stator within a rotatable motor-pump housing wherein said motor-pump housing is rotated by separately passing power fluid under pressure into said cavity; and a pump having a rotor axially spaced from said housing, said rotatable motor-pump housing connected to said rotor, said pump being in communication with said formation fluids to pump said fluids.

2. A downhole pump apparatus as set forth in claim 1 including:

a. production tubing affixed within said well bore with means adjacent said formation to receive said formation fluids therefrom;

b. a fixed inlet power fluid tubing positioned within said production tubing; and c. a fixed return power fluid tubing positioned between said production tubing and said inlet power fluid tubing, wherein said motor-pump housing is rotatably connected to said inlet and said return fluid tubing.

3. A downhole pump apparatus as set forth in claim 1 wherein said progressive cavity motor means includes a hollow flexible shaft attached to said rotor for communicating said power fluid under pressure into said cavity.

4. A downhole pump apparatus as set forth in claim 1 wherein said pump is a progressive cavity pump having a pump chamber formed by an internal helical stator and an internal helical rotor, said rotor connected to said rotatable motor-pump housing.

5. A downhole pump apparatus as set forth in claim 4 wherein said internal helical stator is lined by an elastomeric material.

6. A downhole pump apparatus as set forth in claim 4 wherein said helical stator is lined by a composite material.

7. A downhole pump apparatus for producing fluids from a formation within a well bore to the surface, said apparatus comprising:

production tubing affixed within said well bore;

a fixed inlet power fluid tubing concentrically positioned within said production tubing;

a fixed outlet power fluid tubing concentrically positioned between said production tubing and said inlet power fluid tubing;

a motor-pump housing rotatably connected to said inlet and outlet power fluid tubing, said housing divided into a progressive cavity motor section and a centrifugal pump section, said motor section including a chamber formed by an internal helical stator, within which is an internal helical rotor affixed to said power fluid tubing, a hollow flexible shaft attached to said rotor for communicating inlet power fluid into said chamber and thereby effect the rotation of said motor-pump housing, said helical stator including a chamber for receiving and returning power fluid to said outlet power fluid tubing;

said centrifugal pump section including a pump chamber formed by a plurality of fixed diffusers and rotatable impellers, said impellers connected to said rotatable motor-pump housing; and means to communicate said pump chamber with said formation fluids.

8. A downhole pump apparatus as set forth in claim 7 including a crossover bypass above said pump chamber for channeling produced fluids into said production tubing.

9. A downhole pump apparatus for producing fluids from a formation within a well bore to the surface, said apparatus comprising:

a progressive cavity motor with a fixed internal helical rotor within a housing;

means to rotate said housing by passing fluid under pressure into said cavity; and an axial pump having a rotatable member axially spaced from and driven by said housing, said pump in communication with said formation fluids to pump said formation fluid by said rotation of said housing.

* * * * *